(12) United States Patent
Marwood, Jr. et al.

(10) Patent No.: US 7,975,103 B2
(45) Date of Patent: Jul. 5, 2011

(54) METHOD FOR OPTIMIZED DATA RECORD VERIFICATION

(75) Inventors: James D. Marwood, Jr., Tucson, AZ (US); Roman Yusufov, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 11/854,891

(22) Filed: Sep. 13, 2007

(65) Prior Publication Data

US 2009/0077314 A1    Mar. 19, 2009

(51) Int. Cl.
*G06F 12/00* (2006.01)

(52) U.S. Cl. ........................................ 711/114; 711/154

(58) Field of Classification Search .................. 711/114, 711/154
See application file for complete search history.

(56) References Cited

U.S. PATENT DOCUMENTS

| | | | | | |
|---|---|---|---|---|---|
| 5,072,378 | A | * | 12/1991 | Manka | 714/6 |
| 5,535,372 | A | * | 7/1996 | Benhase et al. | 703/23 |
| 5,900,009 | A | * | 5/1999 | Vishlitzky et al. | 711/113 |

* cited by examiner

*Primary Examiner* — Hashem Farrokh
(74) *Attorney, Agent, or Firm* — Griffiths & Seaton PLLC

(57) ABSTRACT

A method for optimized data record verification when processing data-chained channel control words that span a single count field is provided. The method includes reading a first portion of a count field into a sequence buffer memory buffer and a store count field buffer. The first portion of the count field is copied to a local memory location. A first starting offset based on a size of the first portion of the count field is determined. The first portion of the count field is read into a sequence buffer memory bit bucket. A second portion of the count field, beginning at the first starting offset, is read into the sequence buffer memory buffer and the store count field buffer. The second portion of the count field is copied from the store count field buffer into the local memory location.

17 Claims, 4 Drawing Sheets

METHOD FOR OPTIMIZED DATA RECORD VERIFICATION

BACKGROUND OF THE INVENTION

1. Field of the Invention

The present invention relates in general to computers, and more particularly to a method for optimizing data record verification.

2. Description of the Prior Art

Data storage systems, or disk storage systems, are utilized to process and store data. A storage system may include one or more disk drives. The disk drives may be configured in an array, such as a Redundant Array of Independent Disks (RAID) topology, to provide data security in the event of a hardware or software failure. The data storage systems may be connected to a host, such as a mainframe computer. The disk drives in many data storage systems have commonly been known as Direct Access Storage Devices (DASD).

DASD requires certain Input/Output functions in order to serve its function as permanent data storage for the host. An I/O channel typically connects the DASD and the host processor. The host processor operating system initiates data transfer with a command to the I/O channel. This is done by a series of Channel Command Words (CCW's) that may be forwarded to a DASD controller, for example. The controller interprets the CCW's and commands the DASD to execute the commands. For example a "SEEK" command positions a DASD access mechanism, "SEARCH" commands cause comparison between data sought by the host and data physically stored on the device, a "WRITE" command transfers data from the host to the DASD, and a "READ" command copies data from DASD to the host.

DASD devices typically store data on a track, which is a circular path on the surface of a disk on which information is recorded and from which recorded information is read. Typically these disk drives implement a Count, Key, and Data (CKD) format on the disk drives. For a detailed explanation of CKD architecture, see for example, Marilyn Boyl, Introduction to IBM Direct Access Storage Devices, Science Research Associates Inc., 1981. The format contains a definition of how data is structured in the records contained on the track. A record is a set of one or more related data items grouped together for processing, such that the group may be treated as a unit. Disk drives utilizing the CKD format have a special "address mark" on each track that signifies the beginning of a record on the track. After the address mark is a three-part record beginning with the count field that serves as the record ID and also indicates the lengths of the optional key field and the data field, both of which follow. Also on the track, there is normally one Home Address (HA) that defines the physical location of the track and the condition of the track. The HA typically contains the physical track address, a track condition flag, a cylinder number (CC) and a head number (HH). The combination of the cylinder number and the head number indicates the track address, commonly expressed in the form CCHH. The HA contains the "physical track address" which is distinguished from a "logical track address." Some operating systems, such as the IBM Virtual Machine (VM) operating system, employ a concept of "virtual disks" referred to as user mini-disks, and thus it is necessary to employ logical addresses for the cylinders rather than physical addresses. The first record following the HA is commonly a track descriptor record, sometimes referred to as Record 0, or R0. One or more user records follow R0 on the track. The R0 record contains no key field, but may contain either system or user data. The first part of each user record is an "address marker" that enables the controller to locate the beginning of the record when reading data.

In some cases, a host may send a CCW chain instructing the storage system to perform a read operation with data-chaining enabled, such that multiple CCWs span a single count field. Such cases may cause problems in the efficiency of the storage system as the system works to validate data before it is sent to the host.

SUMMARY OF THE INVENTION

In cases where multiple CCWs span a single count field, a need exists for system and method to utilize existing storage system resources to more efficiently validate data records. Accordingly, in one embodiment, by way of example only, the present invention is a method for optimizing data record verification. A first portion of a count field is read into a sequence buffer memory buffer and a store count field buffer. The first portion of the count field is copied to a local memory location. A first starting offset based on a size of the first portion of the count field is determined. The first portion of the count field is read into a sequence buffer memory bit bucket. A second portion of the count field, beginning at the first starting offset, is read into the sequence buffer memory buffer and the store count field buffer. The second portion of the count field is copied from the store count field buffer into the local memory location.

In another embodiment, again by way of example only, the present invention is a system for optimizing data record verification. At least one processor is operational on a host adapter of a data storage system and configured to read a first portion of a count field into a sequence buffer memory buffer and a store count field buffer, copy the first portion of the count field to a local memory location, determine a first starting offset based on a size of the first portion of the count field, read the first portion of the count field into a sequence buffer memory bit bucket, read a second portion of the count field, beginning at the first starting offset, into the sequence buffer memory buffer and the store count field buffer, and copy the second portion of the count field from the store count field buffer into the local memory location.

In still another embodiment, again by way of example only, the present invention is a computer program product for optimizing data record verification. The computer program product comprises a computer-readable storage medium having computer-readable program code portions stored therein. The computer-readable program code portions include a first executable portion configured to read a first portion of a count field into a sequence buffer memory buffer and a store count field buffer, a second executable portion configured to copy the first portion of the count field to a local memory location, a third executable portion configured to determine a first starting offset based on a size of the first portion of the count field, a fourth executable portion configured to read the first portion of the count field into a sequence buffer memory bit bucket, a fifth executable portion configured to read a second portion of the count field, beginning at the first starting offset, into the sequence buffer memory buffer and the store count field buffer, and a sixth executable portion configured to copy the second portion of the count field from the store count field buffer into the local memory location.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
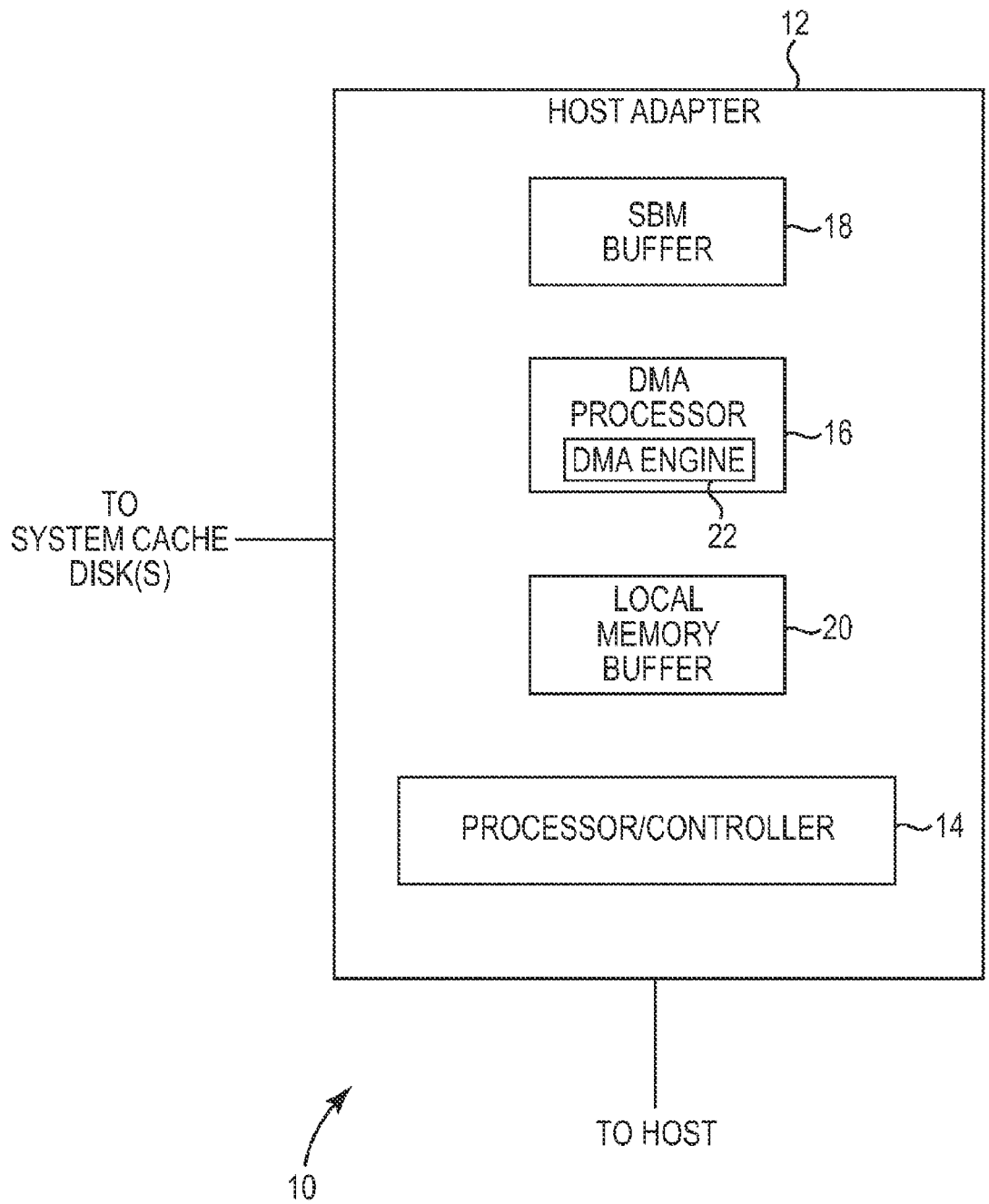
FIG. 1 is a block diagram of an exemplary host adapter of a storage system, in which various aspects of the following detailed description may be implemented.

In one embodiment of a storage system, the responsibility for validating each record pursuant to a read request in CKD architecture is split between a direct memory access (DMA) engine affiliated with a DMA processor operational on a host adapter of the storage system, and microcode executing on the host adapter processor. The integrity of key and data fields is validated in the DMA engine, while the record header (including the count field) is checked in microcode. Each record must be validated prior to being sent to the host. In one embodiment, while data to be sent to the host is accumulated in "Sequence Buffer Memory (SBM) buffers", the record headers are also stored in local memory buffers used for performing header checks. "Sequence buffer memory" may refer to a memory area that has higher storage capacity and higher access latency than the processor local memory (associated with the processor of the host adapter). Because the SBM area is larger in size, and customer data (CKD) records can be very large in size, the SBM area may be used to store data temporarily as the data is forwarded from the storage system to the host for read operations. Because SBM memory is generally slower, storage of the record headers in the generally faster local memory buffers allows for faster checking and validation of data records.

To avoid reading the count field from system cache memory twice, once into an SBM buffer and once into the local memory buffer, the microcode may utilize a DMA Engine hardware function that allows the reading of the count field into both locations using a single DMA operation. In the present description, this DMA Engine hardware function will be referred to as a "Store Count Field (SCF) function," "Store Count Field (SCF) functionality," or "SCF." SCF functionality allows for a copy of the data en route to an SBM buffer to be placed into a temporary SCF buffer. The data is then copied from the temporary SCF buffer into a local memory buffer. If the count field is split between two SBM buffers, then two DMA operations are used with the SCF feature enabled in the second operation, and the data will be placed into the SCF buffer only once the second operation completes.

In general, SCF functionality allows for the transfer of a full Peripheral Component Interconnect (PCI) block of data from system cache into an SBM buffer and a SCF buffer in local processor memory. While the term "SCF functionality" is specifically coined, one skilled in the art will appreciate that other terminology may be used to describe similar functionality where, pursuant to a single DMA operation, data is copied to both of a general memory location (where the data is stored en route to the host) and a local memory location (where portions of the data may be validated). Similarly, variations in terminology may be used to describe SBM memory, the temporary memory locations where data is moved between the host and the storage system.

In one embodiment, SCF may only be used within a Peripheral Component Interconnect (PCI) block that starts at an 8-byte aligned address. The beginning of a count field always corresponds to a new PCI block and, since count fields always start at an 8-byte aligned address, SCF can be used without violating the above restriction, as long as the whole count field is read within a single channel control word (CCW).

When data-chained read CCWs are used, as previously described, it becomes possible for the count field to be split across several CCWs, each only reading part of the count. Since the count field is 8 bytes long, each data-chained CCW handled after the first CCW will start reading at a non 8-byte aligned address. Each data-chained CCW starts a new DMA operation and therefore a new PCI block, which means the PCI block for that operation will not start at an 8-byte aligned address. This violates the SCF restriction described above.

One solution to the SCF restriction is to avoid using SCF for data-chained CCWs. When the last portion of the count field has been DMA-read into an SBM buffer, an additional DMA operation will be performed that reads the whole count field into a local memory buffer. The header checks can then be performed on the local buffer, avoiding accessing SBM memory and working around the SCF restriction. However, after the last portion of the count is read the DMA engine must return on the PCI bus to re-read the whole count, which destroys the benefits of the PCI prefetch mechanism. Additionally, the data in the intermediate data-chained CCWs might not match what was read into the local buffer. For example, if the DMA operation that read a portion of the count field into an SBM buffer became corrupted, but the DMA operation that later read the count into the local buffer completed without errors, then the host would receive corrupted data that would not be detected by header checks performed on the local buffer.

A better solution to the SCF restriction than avoidance of SCF may be implemented, as will be described in detail below. An optimized solution may be implemented that utilizes SCF for each portion of the count field. The optimized solution works around the SCF restriction by always starting at the beginning of the count field and dropping the bytes not requested by the host into a bit bucket SBM. Only the portion being sent to the host is copied into the local buffer. This approach guarantees that the data in the local buffer matches the data sent to the host. It also avoids backing up on the PCI bus and makes full use of PCI prefetch.

Turning to FIG. 1, a block diagram of an exemplary portion 10 of a storage system is illustrated. Storage system portion 10 includes a host adapter 12 configured to be operational on the storage system. As one skilled in the art will appreciate, various subcomponents as will be presently described may be physically associated with the host adapter 12 or otherwise associated with the host adapter 12. For example, a memory component as will be described need not be physically incorporated into the host adapter 12, but may be located elsewhere yet associated with the host adapter 12. Generally, the adapter 12 provides an interface between the storage system (e.g., disk drives and system cache memory) and the host (e.g., mainframe computer).

A variety of subcomponent modules may be associated with host adapter 12, such as a processor/controller module 14 and a DMA processor module 16. A sequence buffer memory (SBM) buffer module 18 is associated with the controller module 14. The processor module 14 may be associated with local memory buffer module 20, where portions of control field(s) are stored as will be described. In addition, DMA processor module 16 may be associated with a DMA engine module 22 as shown, which may comprise hardware, software, firmware, or a combination thereof to perform DMA operations.

A series of software instructions may be executed on the processor/controller 14, the DMA processor 16, or elsewhere. The software instructions may take the form of a computer program product having computer-readable software code comprising a series of executable portions to carry out various steps and techniques in the present description. The computer program products may be stored on a hard disk drive, a compact disk (CD), a digital versatile disk (DVD) a tape medium, or another format.

Figure 2:
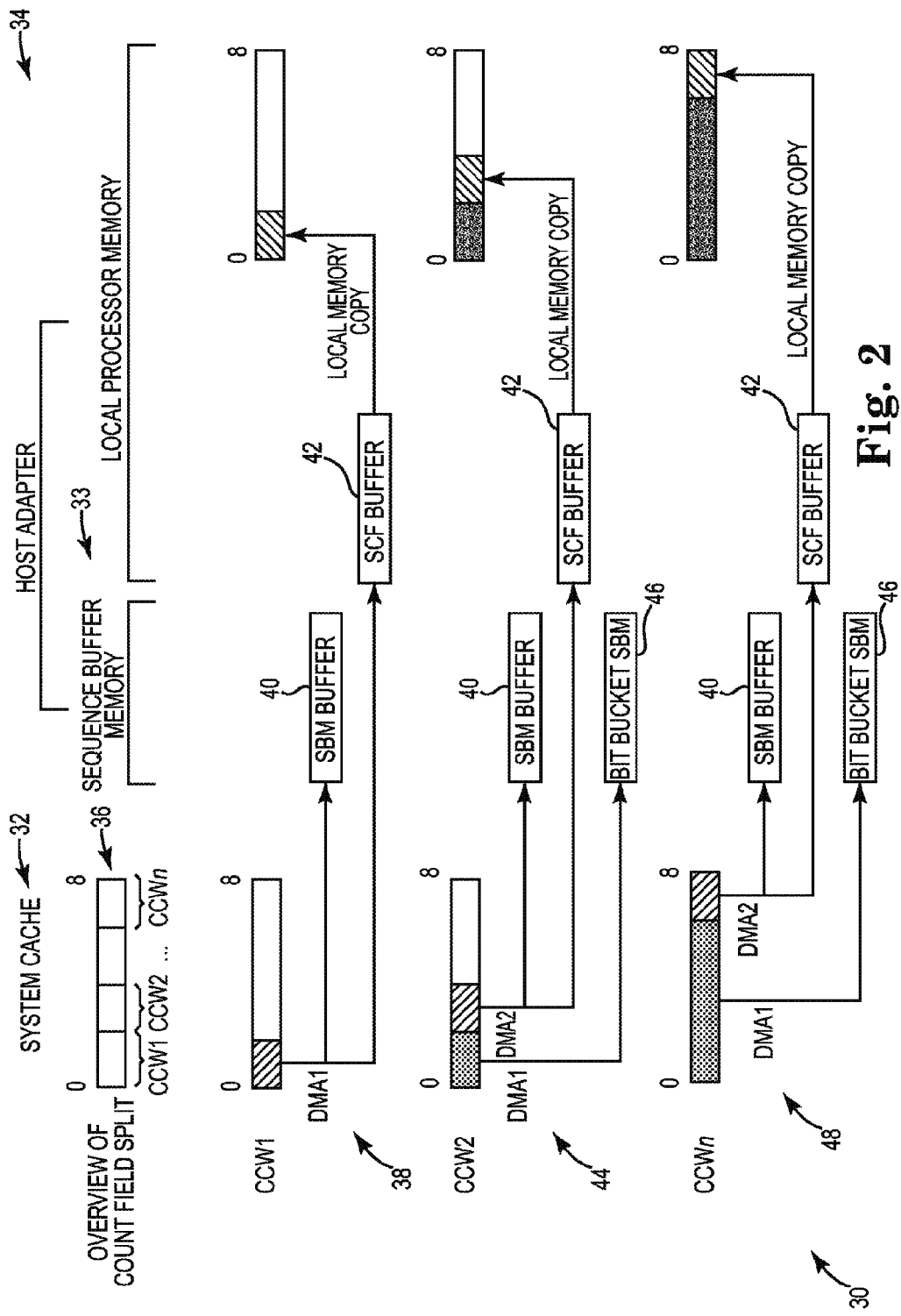
FIG. 2 is an exemplary method of optimizing data record verification.

Turning to FIG. 2, a block diagram of an exemplary method 30 of optimizing data record verification is shown. The method 30 depicts the activity of system cache memory 32, as well as activity in the sequence buffer memory 33 and local processor memory 34 associated with the host adapter. Particularly, the method 30 depicts the processing of a count field 36 into memories 32, 33, and 34. The count field 36 corresponds to a series of split CCWs (denoted as CCW1, CCW2, . . . , CCWn) across the count field 36. In the depicted embodiment, the CCWs are split across portions of the count field as shown from zero (0) to eight (8) bytes.

In a first step 38, a first CCW (denoted by CCW1) is received from the host by the storage system. The CCW1 includes a read instruction to obtain a particular segment of data that will be sent to the host. CCW1 is associated with a first portion of the count field 36. In the depicted embodiment, the portion of the count field associated with CCW1 is two (2) bytes of the eight byte field. A first DMA operation (denoted as DMA1) reads the portion of the count field associated with CCW1 into a temporary CCW associated location in sequence buffer memory. This DMA read places the count field data into SBM buffer 40. The same DMA read coincidentally also reads the count field portion into the SCF buffer 42 in the host adapter local processor memory. The DMA read action is consistent with the SCF functionality described previously and occurs within a single PCI block. The count field portion is then copied to a task-associated location in the host adapter local processor memory. To complete step 38, the data requested by the host that is associated with the first portion of the count field is then sent from the SBM buffer 40 to the host.

In a second step 44, a second CCW (denoted by CCW2) is received by the storage system from the host. CCW2 is associated with a second portion of the count field 36. In the depicted embodiment, the portion of the count field associated with CCW2 is again two (2) bytes of the eight byte field. In a preliminary step, the first two bytes of the field (associated with CCW1) are DMA read (denoted by DMA1) into a bit bucket portion 46 of SBM memory. These two bytes are placed into the bit bucket with the intention that they will be discarded.

As is seen, step 44 continues to use the SCF functionality without violating an SCF restriction by starting at the first or leading byte of the 8 byte aligned address, and reading the two bytes associated with CCW1 into the bit bucket SBM memory 46. The second portion of the count field, the two bytes associated with CCW2, is read into the temporary CCW associated location 40 in SBM memory. These two bytes are again, pursuant to SCF functionality, read into the SCF buffer 42 and copied to the second portion of the count field stored as a local memory copy 34. Data associated with the second portion of the count field is then sent from the SBM buffer memory to the host.

Step 48 denotes the last step relating to an Nth CCW (denoted as CCWn), where, pursuant to the last step, the count field is completely filled and accounted for. A final portion of the count field 36 is associated with CCWn. In this case, this portion is again two (2) bytes of the eight byte count field. Again, pursuant to SCF functionality, the count field bytes associated with all of the previous control words are written into the bit bucket 46 SBM memory starting with the leading byte of the 8 byte aligned address. As a final step, the last two (2) bytes of the count field are read into the SBM buffer 40 and thereby, to the SCF buffer 42. Again, the last two bytes are sent to the local memory copy where they are stored.

As seen, the copy of the count field sent to SBM memory matches exactly what has been stored in local memory. As a result, header checks performed using data saved in local memory accurately represent the same data that is sent to the host. In steps as will be further described, the storage system then may perform validity checks (such as the aforementioned header checks) on the data to be sent to the host using the copy of the count field in local processor memory 34.

If the validity checks are satisfactory, then the remaining data, associated with the remainder of the count field, may be sent to the host. In addition, if the validity checks are satisfactory, then a good status notification may be sent to the host. This good status notification informs the host that the validity checks have been satisfactorily performed, and that the read operation has successfully completed.

To briefly review, step 38 describes a first DMA operation where the first portion of a count field corresponding to the first control word is written into SBM buffer and SCF buffer memories, as well as the local processor memory. Later, in step 44, a new DMA operation reads the first portion into a bit bucket SBM memory. This DMA operation drops all the bytes from the beginning of the count field until the offset where the host read begins. Step 44 guarantees that the PCI block will always start at the beginning of the count field.

Returning to step 44, an additional DMA operation then DMA reads the second portion into the SBM buffer and SCF buffer memories, as well as the local processor memory. This additional DMA operation reads a PCI address that immediately follows the PCI address read by the earlier DMA operation of step 44. As a result, reading of these PCI addresses proceeds in order. It is not necessary to return to an earlier PCI address, allowing for full use of the PCI prefetch mechanism. Step 48 continues the process in a similar manner so as to completely fill the count field.

Figure 3A:
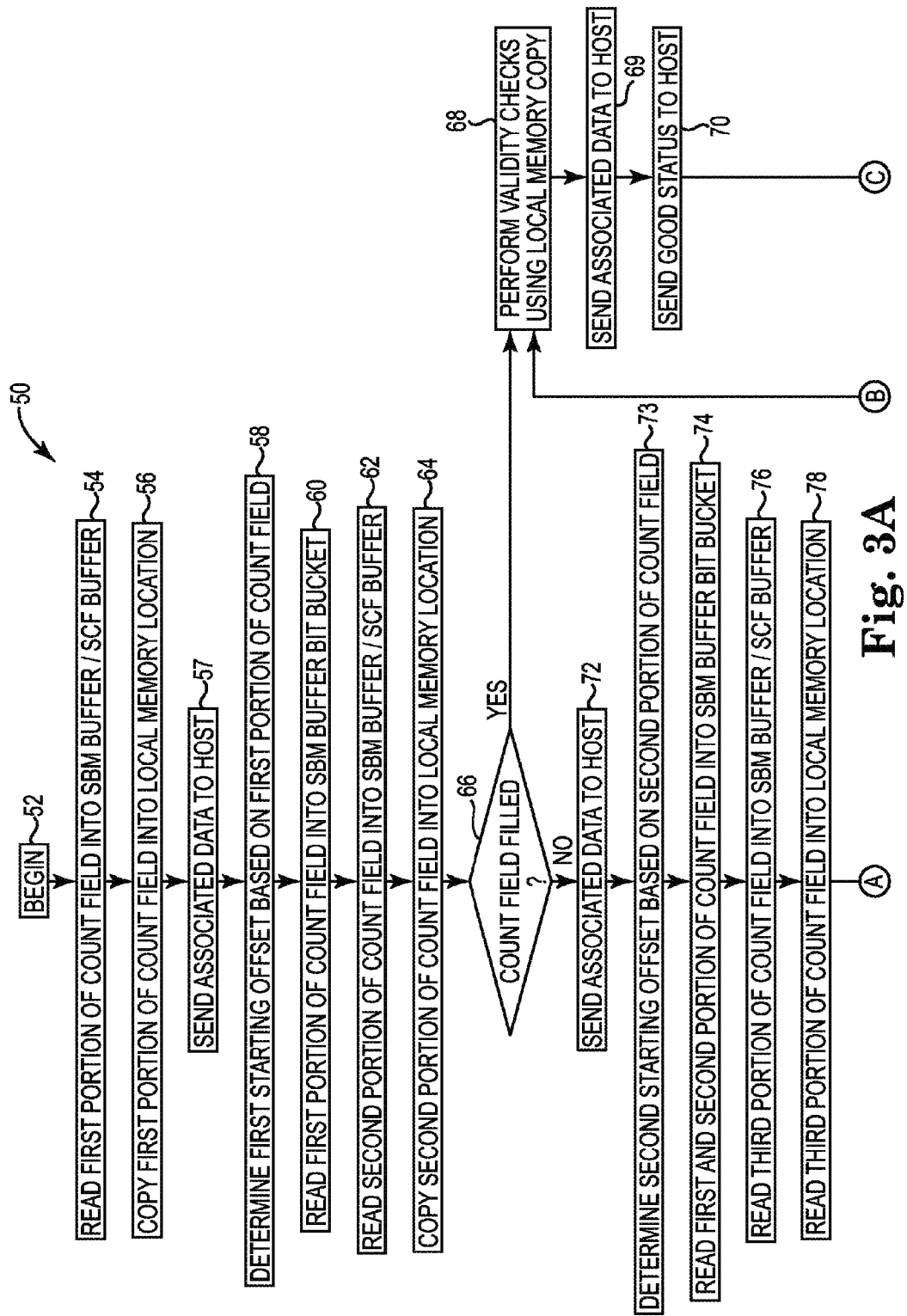
FIG. 3 is a flow chart depicting an exemplary method of optimizing data record verification.
Figure 3B:
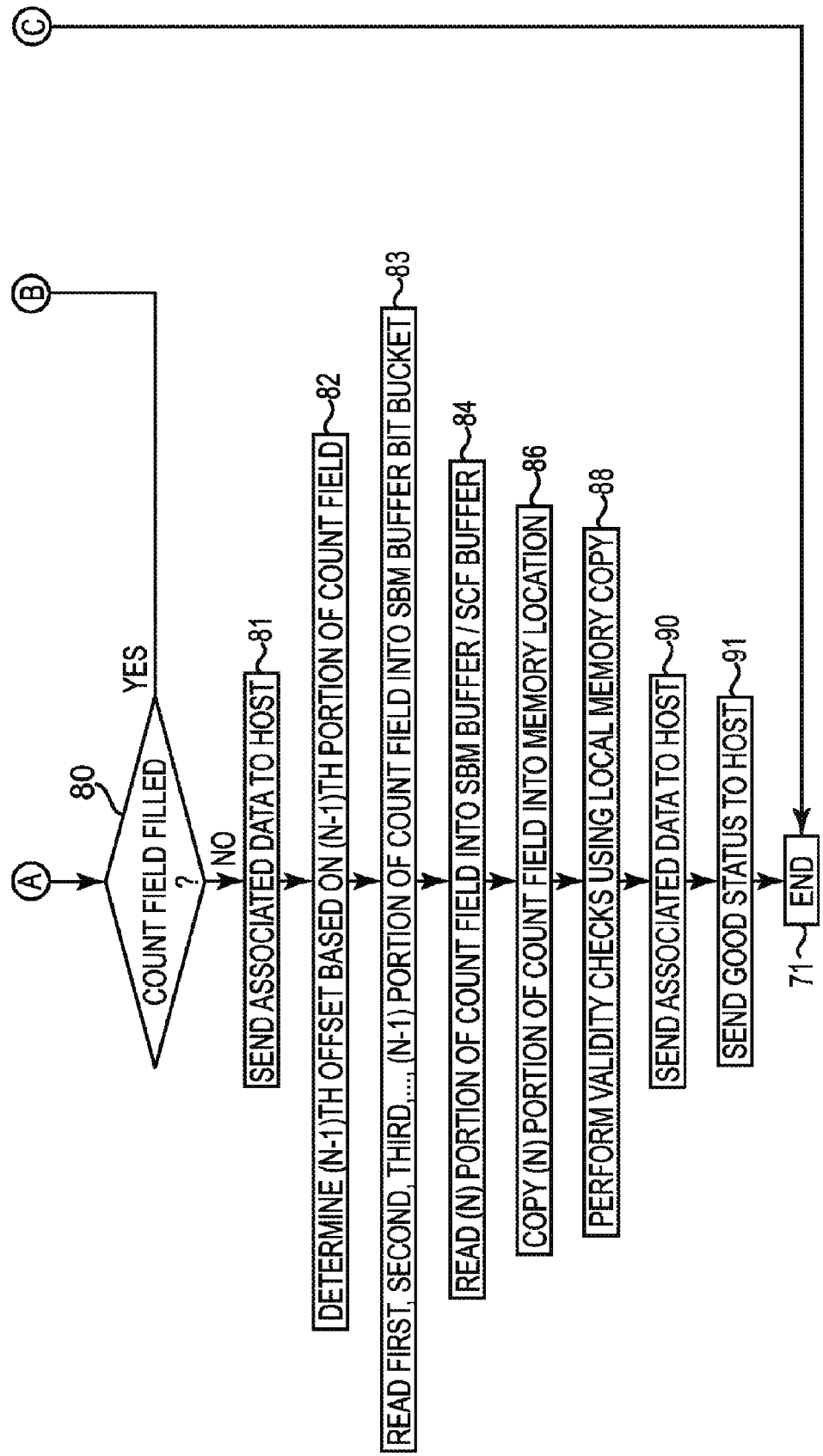

FIG. 3 is an exemplary method 50 of optimizing data record verification in flow chart form. Method 50 begins (step 52) pursuant to a receipt of a CCW chain instructing the storage system to perform read operations, similarly to that previously described. Again, data chaining is enabled, so that multiple CCWs span a single count field. Per the first CCW, a first DMA read of the first portion of the count field into the SBM buffer and SCF buffer memories (step 54) takes place. The first portion of the count field is then copied into the local processor memory location associated with the host adapter (step 56). The data associated with this first CCW is then forwarded to the host (step 57).

The system then determines a first starting offset position based on a size of the first portion of the count field. The first starting offset position is based on an ending byte of the first portion the count field associated with the first CCW (step 58). Pursuant to a new DMA read, the first portion of the count field associated with the first CCW is read into the SBM buffer bit bucket (step 60), while the second portion of the count field is read into the SBM buffer and SCF buffer memory locations (step 62) pursuant to SCF functionality as previously described. The second portion of the count field is read beginning at the first offset position. The second portion is copied into the local memory location (step 64).

If the count field is filled (step 66), then the system performs validity tests on the requested data using the count field data stored in the local memory location (step 68). If the validity tests are satisfactory, the remainder of the data associated with the second CCW is forwarded to the host (step 69). Additionally, a good status notification is sent to the host (step 70). The good status notification informs the host that the data has been validated through the aforementioned validity tests. The method 50 ends (step 71).

However, if the count field is not filled (again, step 66), then the system sends associated data with the second portion of the count field to the host (step 72). The system determines a second starting offset position (step 73). Like the first starting offset position, the second starting offset position is based on an ending byte of the second portion of the count field associated with the second CCW. Once the second starting offset position is determined, the system performs a DMA read of the first and second portions of the count field into the SBM buffer bit bucket (step 74), while the third portion of the count field, beginning at the second offset position, is DMA read into the SBM buffer and SCF buffer memory locations (step 76) and copied into the local memory location (step 78).

If the count field is filled (step 80), then the system performs validity checks as previously described (step 68), and forwards the remaining associated data to the host (step 69) assuming the validity checks are satisfactory, sending the good status notification (step 70). If the count field is still not completely comprised with data associated with the CCWs, then the method 50 continues with additional portions of the count field until the count field is full.

The final portion of the count field that completely fills the count field is denoted as an Nth portion. The processing of this last Nth portion of the count field is now presently described. The various steps proceed similarly to that previously discussed. Data associated with the (N−1)th portion is sent to the host (step 81). An (N−1)th starting offset position is determined, based on the ending byte of the (N−1)th portion of the count field (step 82). Once the starting offset is determined, the first, second, third, and continuing to the (N−1)th portion of the count field is read into the SBM buffer bit bucket (step 83). The Nth portion of the count field is read into the SBM buffer and SCF buffer memory locations (step 84), as the Nth portion is copied into the local memory location (step 86). Since the count field is now filled, the validity checks are performed using the local memory copy (step 88), and the data associated with the remaining CCWs is sent to the host (step 90). Assuming the validity checks are satisfactory, then a good status notification is sent to the host (step 91). The method 50 then ends (again, step 71).

In general, software and/or hardware to implement various embodiments of the present invention, or other functions previously described, such as previously described method 50, can be created using tools currently known in the art.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for optimizing data record verification, comprising:
   reading a first portion of a count field into a sequence buffer memory buffer and a store count field buffer;
   copying the first portion of the count field to a local memory location;
   determining a first starting offset based on a size of the first portion of the count field;
   reading the first portion of the count field into a sequence buffer memory bit bucket;
   reading a second portion of the count field, beginning at the first starting offset, into the sequence buffer memory buffer and the store count field buffer;
   copying the second portion of the count field from the store count field buffer into the local memory location; and
   performing a validity check using the first and second portions of the count field in the local memory location and sending a good status notification to the host if the first and second portions of the count field comprise the entire count field.

2. The method of claim 1, further including, if the first and second portions of the count field do not comprise the entire count field:
   determining a second starting offset based on a size of the second portion of the count field, reading the first and second portion of the count field into the sequence buffer memory bit bucket, reading a third portion of the count field, beginning at the second starting offset, into the sequence buffer memory buffer and the store count field buffer, and copying the third portion of the count field from the store count field buffer into the local memory location.

3. The method of claim 1, further including receiving a channel control word associated with the first portion of the count field.

4. The method of claim 1, wherein reading the first portion of the count field into the sequence buffer memory buffer and the store count field buffer is performed pursuant to a direct memory access operation.

5. The method of claim 4, wherein the direct memory access operation utilizes a store count field function.

6. The method of claim 1, wherein reading the first portion of the count field into a sequence buffer memory bit bucket, reading the second portion of the count field, beginning at the first starting offset, into the sequence buffer memory buffer and the store count field buffer, and copying the second portion of the count field from the store count field buffer into the local memory location are performed within a single peripheral component interconnect block.

7. A system for optimizing data record verification, comprising:

at least one processor, operational on a host adapter of a data storage system, and configured to:

read a first portion of a count field into a sequence buffer memory buffer and a store count field buffer, copy the first portion of the count field to a local memory location, determine a first starting offset based on a size of the first portion of the count field, read the first portion of the count field into a sequence buffer memory bit bucket, read a second portion of the count field, beginning at the first starting offset, into the sequence buffer memory buffer and the store count field buffer, copy the second portion of the count field from the store count field buffer into the local memory location, and performing a validity check using the first and second portions of the count field in the local memory location and sending a good status notification to the host if the first and second portions of the count field comprise the entire count field.

8. The system of claim 7, wherein the at least one processor is further configured to, if the first and second portions of the count field do not comprise the entire count field:

determine a second starting offset based on a size of the second portion of the count field, read the first and second portion of the count field into the sequence buffer memory bit bucket, read a third portion of the count field, beginning at the second starting offset, into the sequence buffer memory buffer and the store count field buffer, and copy the third portion of the count field from the store count field buffer into the local memory location.

9. The system of claim 7, wherein the at least one processor is further configured to receive a channel control word associated with the first portion of the count field.

10. The system of claim 7, wherein the at least one processor is further configured to read the first portion of the count field into the sequence buffer memory buffer and the store count field buffer pursuant to a direct memory access operation.

11. The system of claim 10, wherein the direct memory access operation utilizes a store count field function.

12. A computer program product for optimizing data record verification, the computer program product comprising a computer-readable storage medium having computer-readable program code portions stored therein, the computer-readable program code portions comprising:

a first executable portion configured to read a first portion of a count field into a sequence buffer memory buffer and a store count field buffer;

a second executable portion configured to copy the first portion of the count field to a local memory location;

a third executable portion configured to determine a first starting offset based on a size of the first portion of the count field;

a fourth executable portion configured to read the first portion of the count field into a sequence buffer memory bit bucket;

a fifth executable portion configured to read a second portion of the count field, beginning at the first starting offset, into the sequence buffer memory buffer and the store count field buffer;

a sixth executable portion configured to copy the second portion of the count field from the store count field buffer into the local memory location; and a seventh executable portion configured to performing a validity check using the first and second portions of the count field in the local memory location and sending a good status notification to the host if the first and second portions of the count field comprise the entire count field.

13. The computer program product of claim 12, further including an eighth executable portion configured to, if the first and second portions of the count field do not comprise the entire count field:

determine a second starting offset based on a size of the second portion of the count field, read the first and second portion of the count field into the sequence buffer memory bit bucket, read a third portion of the count field, beginning at the second starting offset, into the sequence buffer memory buffer and the store count field buffer, and copy the third portion of the count field from the store count field buffer into the local memory location.

14. The computer program product of claim 12, further including an eighth executable portion configured to receive a channel control word associated with the first portion of the count field.

15. The computer program product of claim 12, wherein the first executable portion is further configured to read the first portion of the count field into the sequence buffer memory buffer and the store count field buffer pursuant to a direct memory access operation.

16. The computer program product of claim 15, wherein the direct memory access operation utilizes a store count field function.

17. The computer program product of claim 12, wherein the fourth executable portion, the fifth executable portion, and the sixth executable portion are further configured to perform operations within a single peripheral component interconnect block.

\* \* \* \* \*